(12) United States Patent
Singh et al.

(10) Patent No.: US 9,807,672 B1
(45) Date of Patent: Oct. 31, 2017

(54) WIRELESS COMMUNICATION SYSTEM CONTROL OF UPLINK CARRIER AGGREGATION

(71) Applicant: Sprint Communications Company L.P., Overland Park, KS (US)

(72) Inventors: Jasinder Pal Singh, Olathe, KS (US); Ahmad N. Saleh, Rochester Hills, MI (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/280,517

(22) Filed: Sep. 29, 2016

(51) Int. Cl.
*H04B 7/14* (2006.01)
*H04W 40/22* (2009.01)
*H04W 72/04* (2009.01)
*H04W 52/36* (2009.01)
*H04W 76/04* (2009.01)

(52) U.S. Cl.
CPC ......... *H04W 40/22* (2013.01); *H04W 52/365* (2013.01); *H04W 72/0413* (2013.01); *H04W 76/046* (2013.01)

(58) Field of Classification Search
None
See application file for complete search history.

(56) References Cited

U.S. PATENT DOCUMENTS

| | | | |
|---|---|---|---|
| 9,191,098 B2 | 11/2015 | Kazmi et al. | |
| 2010/0254301 A1 | 10/2010 | Blankenship et al. | |
| 2011/0081936 A1 | 4/2011 | Haim et al. | |
| 2012/0052903 A1* | 3/2012 | Han ................ | H04W 52/146 455/522 |
| 2012/0127950 A1 | 5/2012 | Chung et al. | |
| 2012/0147794 A1 | 6/2012 | Chung et al. | |
| 2013/0114472 A1* | 5/2013 | Tamaki ............. | H04L 1/1854 370/280 |
| 2014/0334299 A1 | 11/2014 | Ji et al. | |
| 2014/0349701 A1* | 11/2014 | Vajapeyam ......... | H04W 52/32 455/522 |
| 2017/0041940 A1* | 2/2017 | Falconetti .......... | H04L 5/006 |

* cited by examiner

*Primary Examiner* — Edan Orgad
*Assistant Examiner* — Rebecca Song

(57) ABSTRACT

A wireless relay wirelessly receives user data from User Equipment (UE) using a UE uplink Carrier Aggregation (CA) configuration. The wireless relay wirelessly transfers the user data using a relay uplink. The wireless relay determines available Power Headroom (PHR) for the relay uplink and translates the available PHR into a new UE uplink CA configuration. The wireless relay wirelessly receives additional user data from the UE using the new UE uplink CA configuration.

20 Claims, 6 Drawing Sheets

WIRELESS COMMUNICATION SYSTEM CONTROL OF UPLINK CARRIER AGGREGATION

TECHNICAL BACKGROUND

Wireless communication systems transfer data packets between User Equipment (UE) to provide data communication services, like internet access, media streaming, voice calls, and user messaging. Wireless communication systems allow users to move about and communicate over the air with access communication. Some wireless communication systems use Orthogonal Frequency Division Multiplexing (OFDM) to exchange wireless data with UEs. In OFDM communication systems, resource blocks are used to transfer data simultaneously over various time slots and frequency carriers. One popular wireless communication system that uses the resource block allocation scheme of OFDM communication systems is Long Term Evolution (LTE) communication networks.

To expand or enhance the wireless signal coverage of a wireless communication network, wireless communication relays are added to locations not adequately covered by current network infrastructure. A relay exchanges wireless signaling and data between UEs and another wireless access point. Without the signal repetition provided by the wireless relay, the coverage area of the wireless network access point may otherwise have not extended far enough to serve the UEs using the relay. Thus, a wireless relay provides a less resource intensive means for increasing wireless network coverage. Wireless relays typically backhaul traffic through a communication link to a donor base station.

A wireless communication system may employ Carrier Aggregation (CA). CA allows communication networks, such as Long Term Evolution (LTE) networks, to use multiple resource blocks simultaneously for a UE. A UE uses uplink CA to increase data throughput and transmission speeds to a wireless relay or donor base station. Wireless communication systems can aggregate carriers over frequencies bands using Intra-Band Contiguous CA, Intra-Band Non-Contiguous CA, and Inter-Band CA. Intra-Band Contiguous CA uses component carriers that are in the same frequency band and are adjacent to each other. Intra-Band Non-Contiguous CA uses component carriers that are in the same frequency band but are not adjacent to each other. Inter-Band CA uses component carriers that are in different frequency bands.

Power Headroom (PHR) is a type of Media Access Control (MAC) Control Element that reports the headroom between the maximum transmission power available for a UE and the current transmission power is use by the UE. A wireless access point may use PHR measurement reports to determine how much uplink bandwidth a UE can use in a specific subframe before maxing out the transmission power limit. As the UE uses more resource blocks, such as while using uplink CA, more transmission power is used and therefore, a lower amount of PHR is available. Unfortunately, current methods for dynamically controlling uplink CA used by a UE over a wireless relay are neither efficient nor effective.

TECHNICAL OVERVIEW

A wireless relay wirelessly receives user data from User Equipment (UE) using a UE uplink Carrier Aggregation (CA) configuration. The wireless relay wirelessly transfers the user data using a relay uplink. The wireless relay determines available Power Headroom (PHR) for the relay uplink and translates the available PHR into a new UE uplink CA configuration. The wireless relay wirelessly receives additional user data from the UE using the new UE uplink CA configuration.

DETAILED DESCRIPTION

Figure 1:
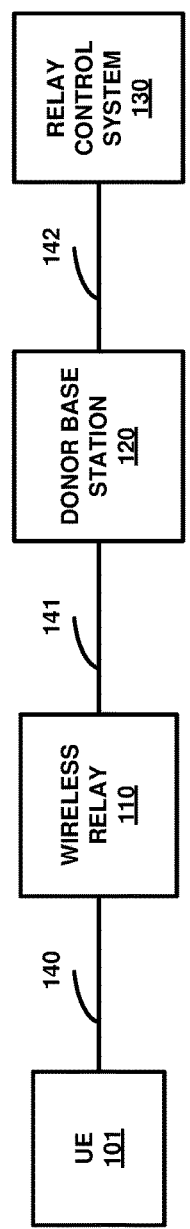
FIGS. 1-3 illustrate a wireless communication system to control uplink Carrier Aggregation (CA).
Figure 2:
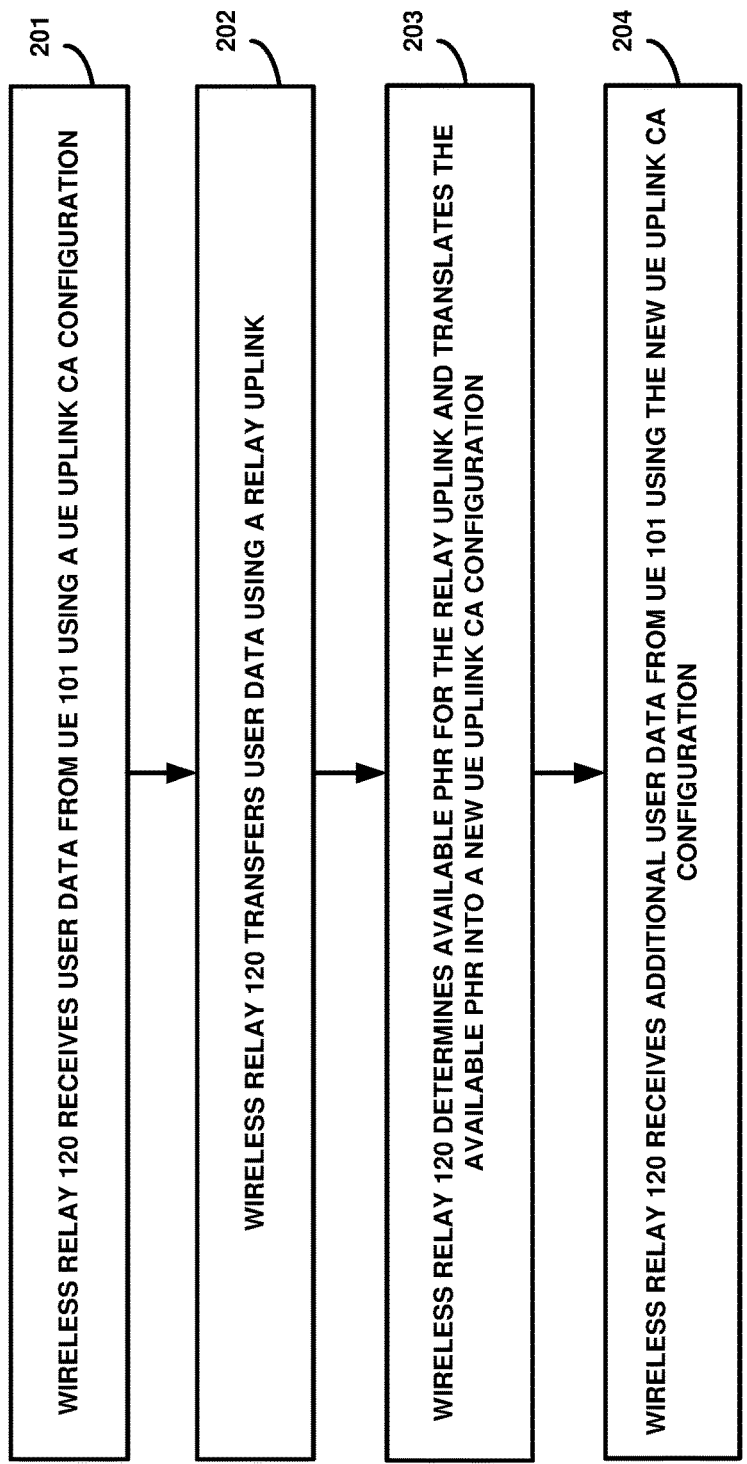
Figure 3:
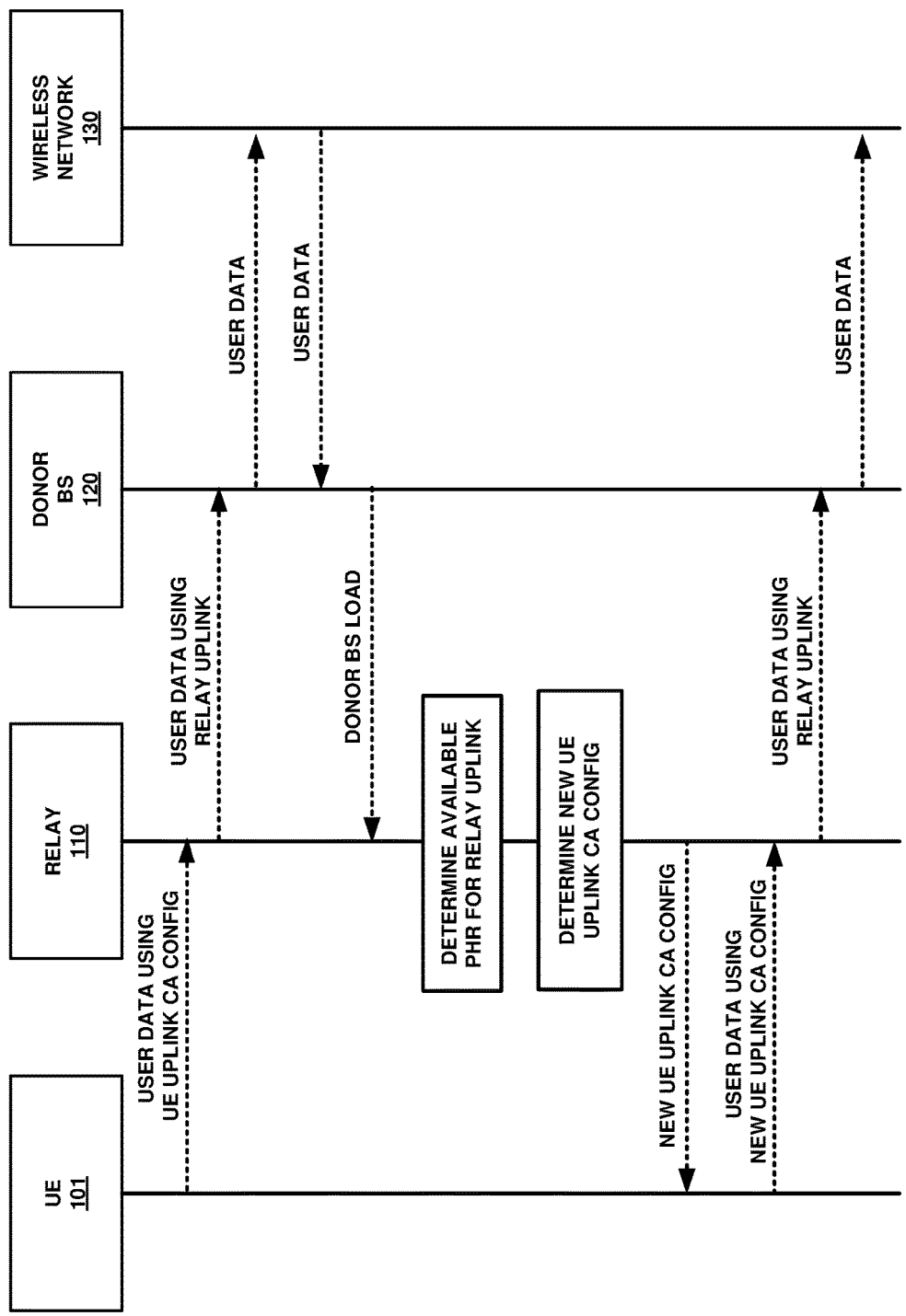

FIGS. 1-3 illustrate wireless communication system 100 to control uplink Carrier Aggregation (CA). Wireless communication system 100 transfers data between User Equipment (UEs) to provide data communication services, like internet access, media streaming, voice calls, and user messaging. Referring to FIG. 1, wireless communication system 100 comprises UE 101, wireless relay 110, donor base station 120, and communication network 130. UE 101 communicates with wireless relay 110 over wireless link 140. Wireless relay 110 communicates with donor base station 120 over wireless link 141. Donor base station 120 communicates with communication network 130 over communication link 142.

UE 101 could be a phone, tablet computer, media device, intelligent machine, or some other apparatus having a wireless communication transceiver. UE 101 includes processing circuitry and memory that store and execute various software modules. UE 101 comprises communication transceivers, such as antennas, ports, bus interfaces, signal processors, memory, and software.

UE 101 transfers various measurement report data to communication network 130 over wireless relay 110 and donor base station 120, such as a Received Signal Strength Indicator (RSSI), a Channel Quality Indicator (CQI), a Precoding Matrix Indicator (PMI), a Rank Index (RI), and Power Headroom (PHR). A PHR measurement report indicates the headroom between the maximum transmission power available for UE 101 and the current transmission power is use by UE 101. UE 101 also transfers user data to wireless relay 110 using CA. CA allows UE 101 to exchange a greater amount of data over a shorter period of time by scheduling multiple resource blocks. Using CA, UE 101 may use a primary component carrier to exchange signaling and data over a primary uplink carrier and one or more secondary component carriers to exchange additional data over additional uplink carriers.

Wireless relay 110 may comprise a mini-macro cell, a femtocell, a picocell, or some other wireless base station capable of providing wireless communication services to UE 101. Donor base station 120 may comprise a macrocell base station, a wireless hotspot, an evolved NodeB (eNodeB), or some other wireless access point that provides wireless communication services to machines with processing circuitry and transceivers. Wireless relay 110 and donor base station 120 each include communication interfaces, microprocessors, storage systems, or some other processing systems or software systems, and may be distributed among multiple devices. In particular, wireless relay 110 and donor base station 120 may be configured to provide wireless coverage to one or more UEs for voice calls, media streaming, internet access, text messages, and the like. Wireless relay 110 and donor base station 120 may also receive PHR measurement reports to determine how much uplink bandwidth UE 101 can use before maxing out the transmission power limit.

Wireless links 140-141 may use air or space to transport media. Wireless link 140 may use protocols, such as Long Term Evolution (LTE) and Orthogonal Frequency Division Multiplexing (OFDM). Wireless link 141 may use protocols, such as LTE, OFDM, Code Division Multiple Access (CDMA), LTE Wireless Aggregation (LWA), Internet Protocol (IP), Wireless Fidelity (WiFi), or some other wireless communication format—including combinations thereof.

Communication link 142 may use metal, glass, optics, air, space, or some other material as the transport media. Communication link 142 may use Time Division Multiplexing (TDM), IP, Ethernet, Synchronous Optical Networking (SONET), communication signaling, wireless communications, or some other communication format—including improvements thereof. Communication link 142 may be a direct link, or can include intermediate networks, systems, or devices, and can include a logical network link transported over multiple physical links.

In operation, wireless relay 110 wirelessly receives user data from UE 101 using a UE uplink CA configuration. User data may include wireless relay 110 attachment information and UE attachment and registration information which permits wireless relay 110 to provide wireless signaling from communication network 130 to UE 101 over donor base station 120. This wireless signaling to UE 101 may LTE signaling, OFDM signaling, or any other similar wireless communication format signaling. The user data may further include wireless communication data for wireless services, such as voice calls, media streaming, internet access, text messages, and the like.

Wireless networks can aggregate carriers over frequencies bands using Intra-Band Contiguous CA, Intra-Band Non-Contiguous CA, and Inter-Band CA. Intra-Band Contiguous CA uses component carriers that are in the same frequency band and are adjacent to each other. Intra-Band Non-Contiguous CA uses component carriers that are in the same frequency band but are not adjacent to each other. Inter-Band CA uses component carriers that are in different frequency bands.

Wireless relay 110 wirelessly transfers the user data using a relay uplink. Wireless relay 110 transfers user data to wireless communication network 130 over donor base station 120 to initiate and establish a media service session for UE 101. The media service session may be a voice call, video streaming, real-time gaming, and the like. In some examples, relay control system 130 may exchange data with multiple wireless relays over multiple base stations.

Wireless relay 110 determines available PHR for the relay uplink. PHR for the relay uplink includes the reported headroom available for wireless relay 110 before maxing out the transmission power limit. Wireless relay 110 translates the available PHR into a new UE uplink CA configuration. The new UE uplink CA configuration may include a new resource block allocation schedule, disablement of a percentage of the UE uplink CA, or complete disablement of the UE uplink CA. The new UE uplink CA configuration may further include an Interband Contiguous channel allocation configuration, and Interband Non-Contiguous channel allocation configuration, or an Intraband Non-Contiguous channel allocation configuration. In a final operation, wireless relay 110 wirelessly receives additional user data from UE 101 using the new UE uplink CA configuration.

FIG. 2 is a flow diagram illustrating an operation of wireless communication system 100 to control uplink CA. Wireless relay 110 wirelessly receives (201) user data from UE 101 using a UE uplink CA configuration. Wireless relay 110 wirelessly transfers (202) the user data using a relay uplink. Wireless relay 110 determines (203) available PHR for the relay uplink and translates (203) the available PHR into a new UE uplink CA configuration. Wireless relay 110 wirelessly receives (204) additional user data from UE 101 using the new UE uplink CA configuration.

FIG. 3 is a sequence diagram illustrating the operation of wireless communication system 100 to control uplink CA. Wireless relay 110 wirelessly receives user data from UE 101 using a UE uplink CA configuration. For example, wireless relay 110 may receive wireless signaling for UE 101 over a primary component carrier and user data from UE 101 over one or more secondary component carriers. The one or more secondary component carriers may be contiguous in the same frequency band or aggregated across multiple frequency bands. For example, UE 101 may transmit wireless signaling with wireless relay 110 over a 1.9 GHz frequency band component carrier and user data over multiple 2.5 GHz frequency band component carriers for media streaming.

Wireless relay 110 wirelessly transfers the user data using a relay uplink. In some examples, wireless relay 110 may transfer the user data over an X2 link, an RRC link, or an Ethernet link. In other examples, wireless relay 110 may transfer the user data over a backhaul data link to donor base station 120. In response, wireless relay 110 may receive available PHR measurements for the relay uplink. Wireless relay 110 may also receive loading measurements for donor base station 120 over an X2 link, an RRC link, an Ethernet link, or some other data communication link.

Wireless relay 110 then determines available PHR for the relay uplink. In some examples, wireless relay 110 may determine the available PHR for the relay uplink and indicate the available PHR from the relay user equipment to an eNodeB in wireless relay 110. In response to determining the available PHR for the relay uplink, wireless relay 110 then translates the available PHR into a new UE uplink CA configuration. It should be noted that in some examples, wireless relay 110 also translates the base station load along with available PHR to determine a new UE uplink CA configuration.

In some examples, wireless relay 110 may translate the available PHR into a new UE uplink CA configuration based on an amount of secondary component carriers currently in use by UE 101. In other examples, wireless relay 110 may translate the available PHR into a new UE uplink CA configuration based on a type Quality-of-Service (QoS) Class Indicators (QCIs) established between UE 101 and donor base station 120 over wireless relay 110. Additional methods of translating the available PHR into a new UE uplink CA configuration are also available for wireless relay 110. After determining the new UE uplink CA for UE 101, wireless relay 110 may then transfer an instruction to UE 101 indicating the new UE uplink CA for UE 101 to use when wirelessly transmitting additional user data.

Wireless relay 110 wirelessly receives additional user data from the UE using the new UE uplink CA configuration. In some examples, the new UE uplink CA configuration may comprise disabling uplink CA for UE 101 completely. In other examples, the new UE uplink CA configuration may comprise disabling only a percentage of uplink CA for the UE. For example, the original UE uplink CA configuration may have comprised four secondary component carriers and the new UE uplink CA configuration may comprise only two secondary component carriers where 50% of the UE uplink CA component carriers have been disabled.

Figure 4:
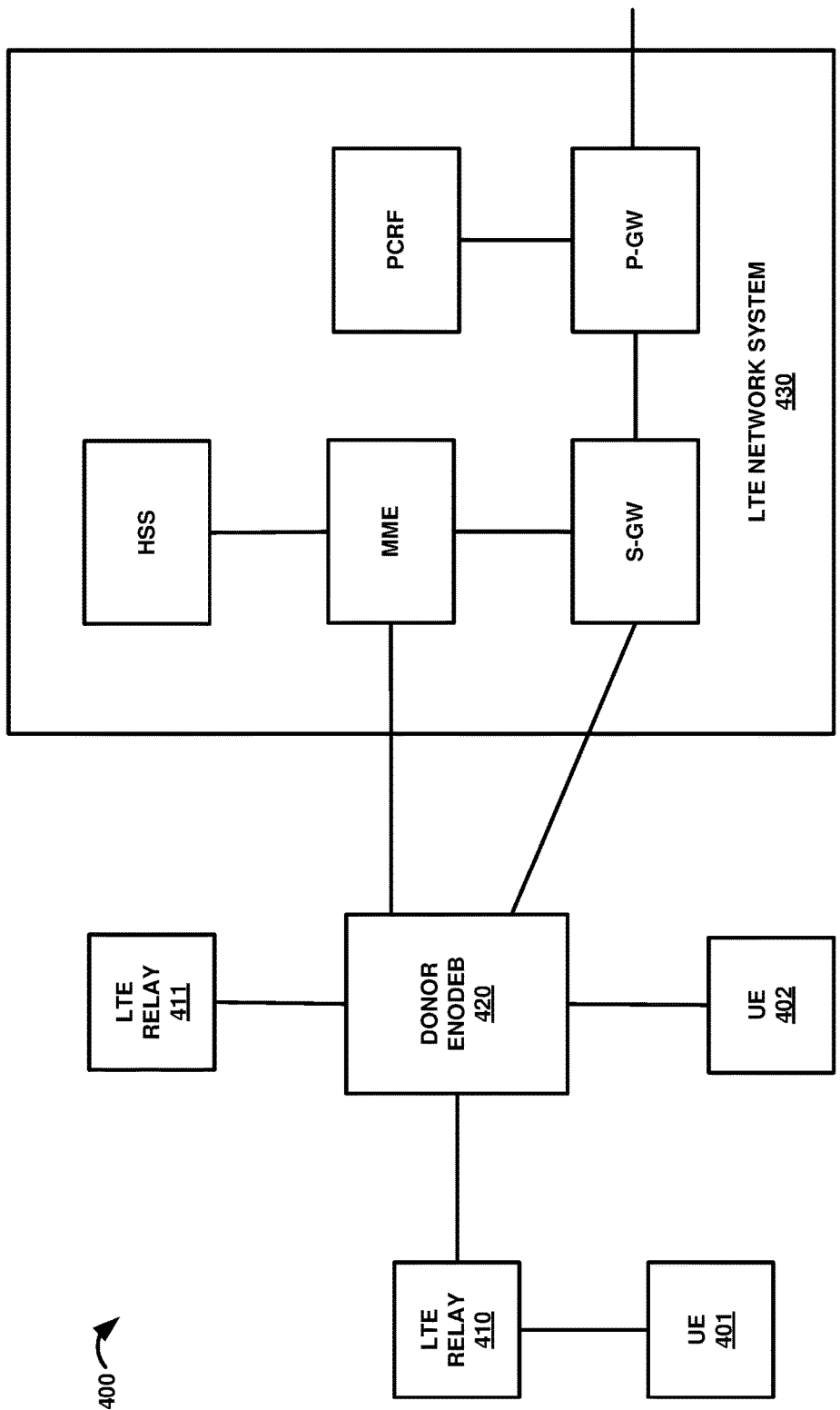
FIGS. 4-5 illustrate a Long Term Evolution (LTE) communication system to control uplink CA.

FIG. 4 illustrates Long Term Evolution (LTE) communication system 400 to control uplink CA. LTE communication system 400 is an example of communication system 100, although communication system 100 may use alternative configurations and operations. LTE communication system 400 includes UE 401, UE 402, LTE relay 410, donor eNodeB 420, and LTE network 430. LTE network 430 includes a Serving Gateway (S-GW), a Mobility Management Entity (MME), a Home Subscriber Server (HSS), a Packet Data Network Gateway (P-GW), and a Policy Charging Rules Function (PCRF).

Still referring to FIG. 4, UE 401 exchanges data and signaling with LTE relay 410 over Radio Frequency (RF) communication links. UE 402 exchanges data and signaling with donor eNodeB 420 over RF communication links. LTE relay 410 communicates with donor eNodeB 420 over an X2 interface link. Donor eNodeB 420 communicates with the S-GW over an S1-U data link. Donor eNodeB 420 communicates with the MME over an S1-MME signaling link. The MME and the HSS exchange data over a Diameter link. The S-GW and the P-GW communicate over an S5 or S8 data link. The P-GW and the PCRF exchange data over a Diameter link.

In operation, LTE relay 410 attaches to and registers with LTE network 430 over donor eNodeB 420. Thus, the MME and HHS determine Access Point Names (APNs) for LTE relay 410 and establish default bearers through the P-GW. UE 401 then attaches to and registers with LTE network 430 over LTE relay 410 and donor eNodeB 420. Donor eNodeB 420 then exchanges user data with UE 401 over LTE relay 410. At this point UE 401 is uploading data to LTE relay 410 using uplink CA.

Figure 5:
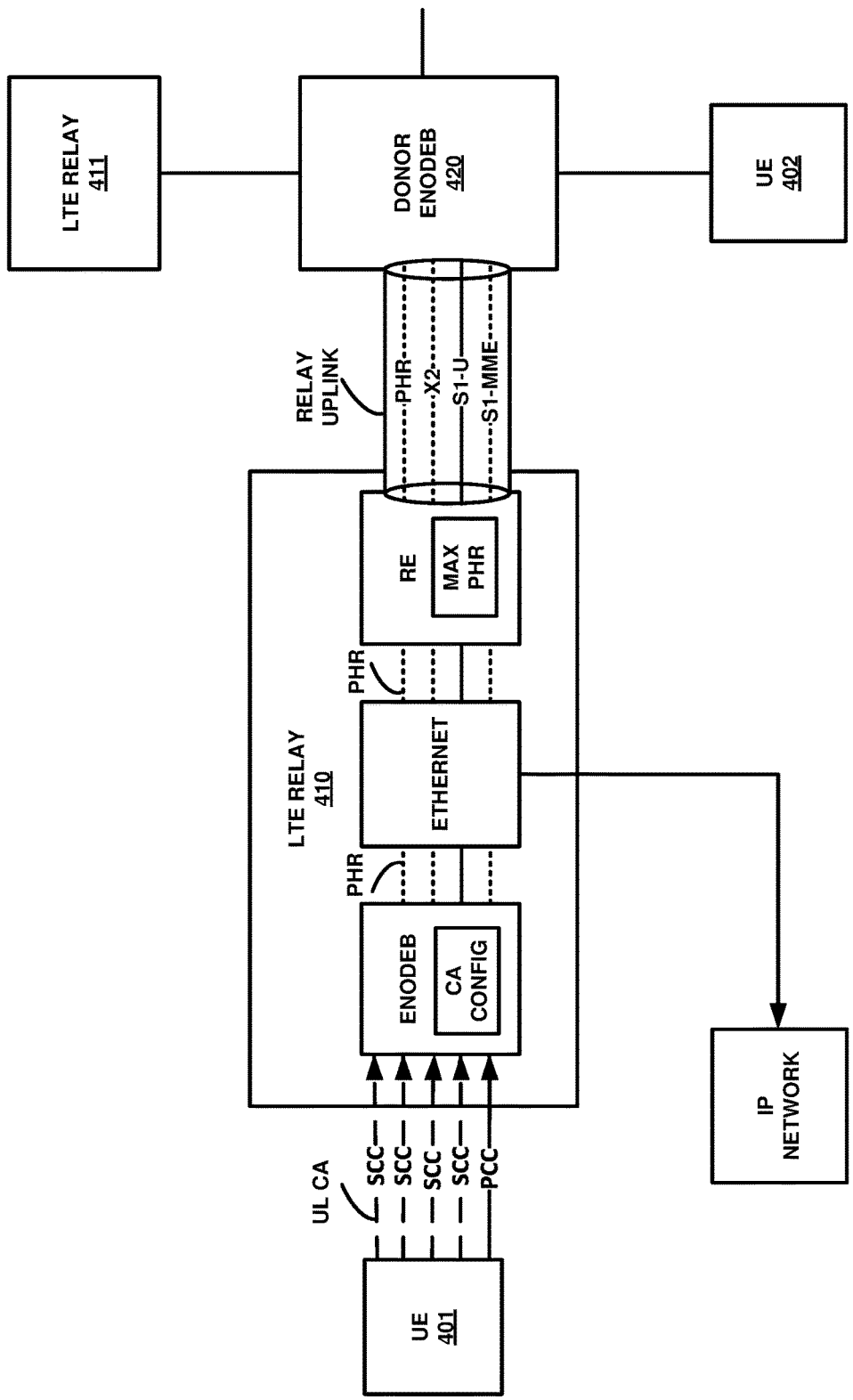

FIG. 5 illustrates an operation of LTE communication system 400 to control uplink CA. LTE relay 410 comprises a relay eNodeB, an Ethernet switch, and a Relay Equipment (RE). The RE includes processing circuitry and memory that store and execute various software modules. The RE also comprises communication transceivers, such as antennas, ports, bus interfaces, signal processors, memory, and software.

LTE relay 410 exchanges data and signaling over an X2 interface link, S1-U interface link, and an S1-MME interface link through the relay eNodeB, the Ethernet switch, and the RE. The relay eNodeB receives UE uplink CA from UE 401 over four secondary component carriers and a primary component carrier. For example, UE 401 may initially use an Intraband Non-Contiguous CA configuration in which LTE relay 410 receives wireless signaling for UE 401 over a primary component carrier in a first frequency band (as shown by the solid line between UE 401 and LTE relay 410) and video streaming over four contiguous secondary component carrier in a second frequency band (as shown by the four dashed lines between UE 401 and LTE relay 410).

The Ethernet switch is capable of communicating user data with external entities using communication links, such as Data Over Cable Service Interface Specification (DOCSIS), Ethernet, WiFi, Wavelength Division Multiplexing (WDM), Time Division Multiplexing (TDM), Internet Protocol (IP), and the like. The RE in LTE relay 410 is capable of transferring user data to donor eNodeB 420 over the relay uplink. For example, the relay uplink may be used to transfer backhaul data from the RE in LTE relay 410 to donor eNodeB 420.

The relay uplink may transfer the backhaul data using an LTE CA configuration, WiFi, or some other communication link. For example, the backhaul data may be transferred over the relay uplink using LWA. The RE also receives PHR information and base station loading information from donor eNodeB 420. It should be noted that the RE may also receive the PHR information and base station loading information over an RRC link, the X2 link, the S1-MME link, an Ethernet link, or some other communication link. The PHR information is processed in the RE along with max PHR information to determine the available PHR for the relay uplink.

The available PRH and the base station loading information are then transferred to the relay eNodeB in LTE relay 410 to translate the available PHR and the base station loading information into a new UE uplink CA configuration. For example, the relay eNodeB in LTE relay 410 may completely disable the four secondary component carriers for the UE uplink CA. The new UE uplink CA configuration is then transferred from the relay eNodeB component in LTE relay 410 to UE 401 in an instruction to use for additional user data transmissions. LTE relay 410 wirelessly receives additional user data from UE 401 using the new UE uplink CA configuration.

Figure 6:
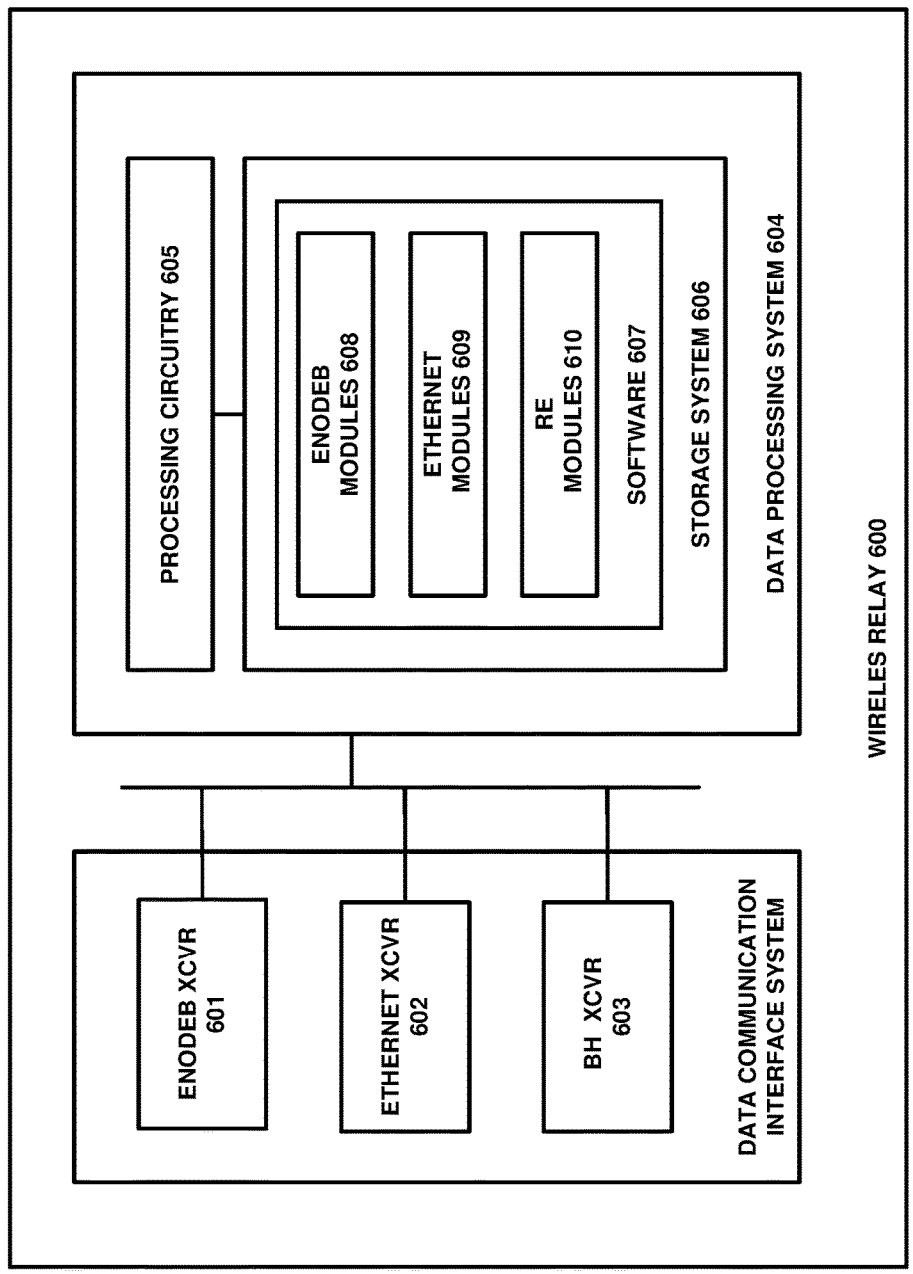
FIG. 6 illustrates a wireless relay to control uplink CA.

FIG. 6 illustrates wireless relay 600 to control uplink CA. Wireless relay 600 is an example of wireless relay 110 and wireless relay 410, although wireless relay 110 and wireless relay 410 may use alternative configurations and operations. Wireless relay 600 includes a data communication interface system comprising eNodeB transceiver 601, Ethernet transceiver 602, and backhaul transceiver 603. Wireless relay 600 also contains data processing system 604. Data processing system 604 is linked to eNodeB transceiver 601, Ethernet transceiver 602, and backhaul transceiver 603.

eNodeB transceiver 601, Ethernet transceiver 602, and backhaul transceiver 603 comprise communication components, such as antennas, ports, amplifiers, filters, modulators, signal processors, and the like. eNodeB transceiver 601 may be configured to use TDM, IP, WiFi, LTE, OFDM, or some other wireless communication protocol. In particular, eNodeB transceiver 601 may be configured to exchange signaling and data with one or more UEs using UE uplink CA. Ethernet transceiver 602 may be configured to communicate over air or some other communication media material, such as DOCSIS, Ethernet, WiFi, WDM, TDM, IP, and the like.

Backhaul transceiver 603 may be configured to communicate over metallic, wireless, optical links, or some other communication media material. Backhaul transceiver 603 may be configured to use TDM, IP, Ethernet, optical networking, wireless protocols, communication signaling, or some other communication format—including combinations thereof. In particular, backhaul transceiver 603 may be further configured to exchange data a signaling with a donor base station using a relay uplink.

Data processing system 604 includes processing circuitry 605 and storage system 606 that stores software 607. Processing circuitry 605 comprises a microprocessor and other circuitry that retrieves and executes software 607 from storage system 606. Storage system 606 comprises a non-transitory storage medium, such as a disk drive, flash drive, data storage circuitry, or some other memory apparatus. Software 607 comprises computer programs, firmware, or some other form of machine-readable processing instructions. Software 607 may further include an operating system, utilities, drivers, network interfaces, applications, or some other type of software. When executed by processing circuitry 605, software 607 directs processing system 604 to operate wireless relay 600 as described herein.

In particular, when executed by processing circuitry 605, eNodeB module 608 directs processing circuitry 605 to receive user data from a UE using a UE uplink CA configuration. When executed by processing circuitry 605, eNodeB module 608 also directs processing circuitry 605 to translate the available PHR and base station loading data into a new UE uplink CA configuration. When executed by processing circuitry 605, eNodeB module 608 also directs processing circuitry 605 to receive additional user data from the UE using a new UE uplink CA configuration. When executed by processing circuitry 605, eNodeB module 608 also directs processing circuitry 605 to perform functions, such as Baseband Unit (BBU) processes, Radio Link Controller (RLC) processes, LTE-WLAN Aggregation (LWA) processes, Packet Data Convergence Protocol (PDCP) processes, and the like.

When executed by processing circuitry 605, Ethernet module 609 directs processing circuitry 605 to transfer data to external entities. When executed by processing circuitry 605, Relay Equipment (RE) module 610 directs processing circuitry 605 to transfer user data using a relay uplink. When executed by processing circuitry 605, RE module 610 directs processing circuitry 605 to receive PHR information and donor base station loading data. When executed by processing circuitry 605, RE module 610 also directs processing circuitry 605 to determine available PHR for the relay uplink.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a wireless communication system to control uplink Carrier Aggregation (CA), the method comprising:
a wireless relay wirelessly receiving user data from User Equipment (UE) using a UE uplink CA configuration;
the wireless relay wirelessly transferring the user data using a relay uplink;
the wireless relay determining available Power Headroom (PHR) for the relay uplink and translating the available PHR into a new UE uplink CA configuration; and
the wireless relay wirelessly receiving additional user data from the UE using the new UE uplink CA configuration.

2. The method of claim 1 wherein the new UE uplink CA configuration comprises disabling uplink CA for the UE.

3. The method of claim 1 wherein the new UE uplink CA configuration comprises disabling a percentage of uplink CA for the UE.

4. The method of claim 1 wherein the wireless relay determining the available PHR for the relay uplink comprises a relay user equipment determining the available PHR for the relay uplink and further comprising indicating the available PHR from the relay user equipment to an evolved NodeB (eNodeB) in the wireless relay.

5. The method of claim 1 wherein translating the available PHR into a new UE uplink CA configuration further comprises translating the available PHR and a donor base station load into the new UE uplink CA configuration.

6. The method of claim 5 further comprising receiving the donor base station load from the donor base station.

7. The method of claim 1 further comprising receiving a donor base station load from the donor base station over an X2 link.

8. The method of claim 1 further comprising receiving a donor base station load from the donor base station over a Radio Resource Control (RRC) link.

9. The method of claim 1 further comprising receiving a donor base station load from the donor base station over an Ethernet link.

10. The method of claim 1 wherein the wireless communication system comprises a Long Term Evolution (LTE) communication system.

11. A wireless relay to control uplink Carrier Aggregation (CA), the wireless relay comprising:
a communication transceiver configured to wirelessly receive user data from User Equipment (UE) using a UE uplink CA configuration;
the communication transceiver configured to wirelessly transfer the user data using a relay uplink;
a data processor configured to determine available Power Headroom (PHR) for the relay uplink and translate the available PHR into a new UE uplink CA configuration; and
the communication transceiver configured to wirelessly receive additional user data from the UE using the new UE uplink CA configuration.

12. The wireless relay of claim 11 wherein the new UE uplink CA configuration comprises the data processor configured to disable uplink CA for the UE.

13. The wireless relay of claim 11 wherein the new UE uplink CA configuration comprises the data processor configured to disable a percentage of uplink CA for the UE.

14. The wireless relay of claim 11 wherein the data processor configured to determine available PHR for the relay uplink comprises a relay user equipment configured to determine the available PHR for the relay uplink and indicate the available PHR from the relay user equipment to an evolved NodeB (eNodeB) in the wireless relay.

15. The wireless relay of claim 11 wherein the data processor configured to translate the available PHR into a new UE uplink CA configuration further comprises the data processor configured to translate the available PHR and a donor base station load into the new UE uplink CA configuration.

16. The wireless relay of claim 15 further comprising the communication transceiver configured to receive the donor base station load from the donor base station.

17. The wireless relay of claim 11 further comprising the communication transceiver configured to receive a donor base station load from the donor base station over an X2 link.

18. The wireless relay of claim 11 further comprising the communication transceiver configured to receive a donor base station load from the donor base station over a Radio Resource Control (RRC) link.

19. The wireless relay of claim 11 further comprising the communication transceiver configured to receive a donor base station load from the donor base station over an Ethernet link.

20. The wireless relay of claim 11 wherein the wireless relay comprises a Long Term Evolution (LTE) relay.

\* \* \* \* \*